US012700344B2

(12) United States Patent
Lai et al.

(10) Patent No.: US 12,700,344 B2
(45) Date of Patent: Aug. 4, 2026

(54) DISPLAY DEVICE

(71) Applicant: AUO Corporation, Hsinchu City (TW)

(72) Inventors: Chun-Chi Lai, Hsinchu City (TW); Chia-Hsien Chu, Hsinchu City (TW); Ching-Sheng Cheng, Hsinchu City (TW); Li-Wei Shih, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 18/950,149

(22) Filed: Nov. 17, 2024

(65) Prior Publication Data

US 2026/0004710 A1 Jan. 1, 2026

(30) Foreign Application Priority Data

Jun. 28, 2024 (TW) ................................ 113124420

(51) Int. Cl.
*G09G 3/32* (2016.01)

(52) U.S. Cl.
CPC ....... *G09G 3/32* (2013.01); *G09G 2310/0267* (2013.01); *G09G 2310/0297* (2013.01); *G09G 2310/08* (2013.01)

(58) Field of Classification Search
None
See application file for complete search history.

(56) References Cited

U.S. PATENT DOCUMENTS 5,510,807 A * 4/1996 Lee ..................... G09G 3/3688 345/94
9,292,117 B2 3/2016 Kim et al.
9,563,310 B2 2/2017 Kim et al.
9,958,975 B2 5/2018 Kim et al.
9,977,527 B2 5/2018 Kim et al.
10,175,803 B2 1/2019 Kim et al.
12,142,198 B1 * 11/2024 Watanabe ................ G09G 3/32
2005/0243043 A1 * 11/2005 Jeoung ................. G09G 3/3688 345/87
2005/0270257 A1 * 12/2005 Shin ..................... G09G 3/3275 345/76
2006/0151745 A1 * 7/2006 Kim ....................... G09G 3/325 252/301.16

(Continued)

FOREIGN PATENT DOCUMENTS

CN 117351863 A * 1/2024 ............... G09G 3/20
TW 201344535 11/2013
TW 201349052 12/2013

*Primary Examiner* — Patrick N Edouard
*Assistant Examiner* — Peijie Shen
(74) *Attorney, Agent, or Firm* — JCIPRNET

(57) ABSTRACT

A display device is provided. The display device includes a pixel array, a multiplexer circuit, and a plurality of emission driving circuits. The multiplexer circuit receives a plurality of data voltages and a plurality of multiplexing control signals to provide the data voltages to self-luminous pixel circuits of the pixel array based on the multiplexing control signals. The emission driving circuits provides a plurality of emission signals to the self-luminous pixel circuits. During a horizontal scanning period, a first edge and a second edge of an emission pulse formed on the corresponding one of the emission signals, wherein the first edge and the second edge are at least one charge discharge time far away from second multiplexing edges of a precharge pulse and multiplexer pulses.

6 Claims, 7 Drawing Sheets

(56) References Cited

U.S. PATENT DOCUMENTS

| | | | | |
|---|---|---|---|---|
| 2010/0134400 | A1* | 6/2010 | Chiang | G09G 3/3688 345/98 |
| 2011/0157135 | A1* | 6/2011 | Lee | G09G 3/3291 345/76 |
| 2013/0100173 | A1* | 4/2013 | Chaji | G09G 5/10 345/76 |
| 2013/0271420 | A1 | 10/2013 | Chen et al. | |
| 2018/0059838 | A1 | 3/2018 | Chung et al. | |
| 2018/0068611 | A1* | 3/2018 | Chaji | G09G 3/325 |
| 2018/0090085 | A1* | 3/2018 | Enami | G09G 3/3655 |
| 2019/0043421 | A1* | 2/2019 | Yang | G09G 3/3291 |
| 2019/0304374 | A1* | 10/2019 | Wang | G09G 3/3266 |
| 2020/0394953 | A1* | 12/2020 | Kim | G09G 3/32 |
| 2021/0043149 | A1* | 2/2021 | Yoo | G09G 3/3291 |
| 2021/0327322 | A1* | 10/2021 | Ito | G09G 3/20 |
| 2022/0148505 | A1* | 5/2022 | Chang | G09G 3/3233 |
| 2022/0262320 | A1* | 8/2022 | Chang | G09G 3/3291 |
| 2022/0383803 | A1* | 12/2022 | Jang | G09G 3/32 |
| 2023/0029234 | A1* | 1/2023 | Son | G09G 3/3266 |
| 2023/0186848 | A1* | 6/2023 | Ueno | G09G 3/20 345/214 |
| 2023/0306914 | A1* | 9/2023 | Lee | G09G 3/3233 |
| 2025/0118255 | A1* | 4/2025 | Zhou | G09G 3/3233 |
| 2025/0157390 | A1* | 5/2025 | Guo | G09G 3/3275 |

* cited by examiner

DISPLAY DEVICE

CROSS-REFERENCE TO RELATED APPLICATION

This application claims the priority benefit of Taiwan application serial no. 113124420, filed on Jun. 28, 2024. The entirety of the above-mentioned patent application is hereby incorporated by reference herein and made a part of this specification.

BACKGROUND

Technical Field

The disclosure relates to a display device, and particularly relates to a display device having self-luminous pixel circuits.

Description of Related Art

With the advancement of semiconductor manufacturing technology, the volume of various electronic products is gradually developing towards lightweight and thin designs. Generally, the display panel of a display device is constituted by a pixel array, and the source driver transmits the required data voltage to the pixel array via a plurality of data lines. Moreover, as the resolution of the display panel increases, the number of data lines also increases, resulting in an increase in the number of pins on the source driver. Therefore, multiplexer circuits are disposed between the pixel array and the source driver to reduce the number of pins on the source driver. However, when the pixel array is constituted by self-luminous pixel circuits, the emission signal that lighting up the self-luminous pixel circuits may affect the data voltage transmitted by the multiplexer circuits, thus affecting the display of the frame.

SUMMARY

The disclosure provides a display device that may stagger the pulse edges of multiplexing control signals and the pulse edges of emission signals to reduce the influence of the pulse edges of emission signals on the data voltage.

The display device of the disclosure includes a pixel array, a plurality of multiplexer circuits, and a plurality of emission driving circuits. The pixel array has a plurality of self-luminous pixel circuits arranged in an array. The multiplexer circuits are coupled to the pixel array and receive a plurality of data voltages and a plurality of multiplexing control signals to provide the data voltages to the self-luminous pixel circuits based on the multiplexing control signals. The emission driving circuits are coupled to the pixel array to provide a plurality of emission signals to the self-luminous pixel circuits. During a horizontal scanning period, the multiplexing control signals simultaneously form a precharge pulse and sequentially form a plurality of multiplexer pulses which are not overlapped to each other in time, wherein the precharge pulses and the multiplexer pulses have a first multiplexing edge in front and a second multiplexing edge in back. A corresponding one of the emission signals forms an emission pulse having a first edge and a second edge, wherein the first edge and the second edge are at least one charge discharge time away from the second multiplexing edges of the precharge pulses and the multiplexer pulses.

Based on the above, in the display device of implementations of the disclosure, during the horizontal scanning period, the first edge and the second edge of the corresponding one of the emission signals are at least one charge discharge time away from the second multiplexing edges of the precharge pulses and the multiplexer pulses, to reduce the influence of the first edge and the second edge of the emission pulse of the emission signal on the data voltage.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Unless otherwise defined, all terminology (including technical and scientific terminology) used herein has the same meaning as commonly understood by those of ordinary skill in the art to which this invention belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

It should be understood that although the terms "first", "second", "third", etc. may be used herein to describe various components, parts, areas, layers and/or sections, the components, parts, areas, layers and/or sections should not be limited by the terms. The terms are only used to distinguish one component, part, area, layer or section from another component, part, area, layer or section. Thus, a "first component", "part", "area", "layer" or "section" discussed below may be termed a second component, part, area, layer or section without departing from the teachings herein.

The terminology used herein is for the purpose of describing particular implementations only and is not intended to be limiting. As used herein, the singular forms "a", "an" and "the" are intended to include the plural forms as well, including "at least one", unless the context clearly indicates otherwise. "Or" means "and/or". As used herein, the term "and/or" includes any and all combinations of one or more of the associated listed items. It should also be understood that when used in this specification, the terms "comprises" and/or "comprising" specify the presence of stated features, regions, integers, steps, operations, components, and/or parts, but do not preclude the presence or addition of one or more other features, regions, integers, steps, operations, components, parts and/or groups thereof.

Figure 1:
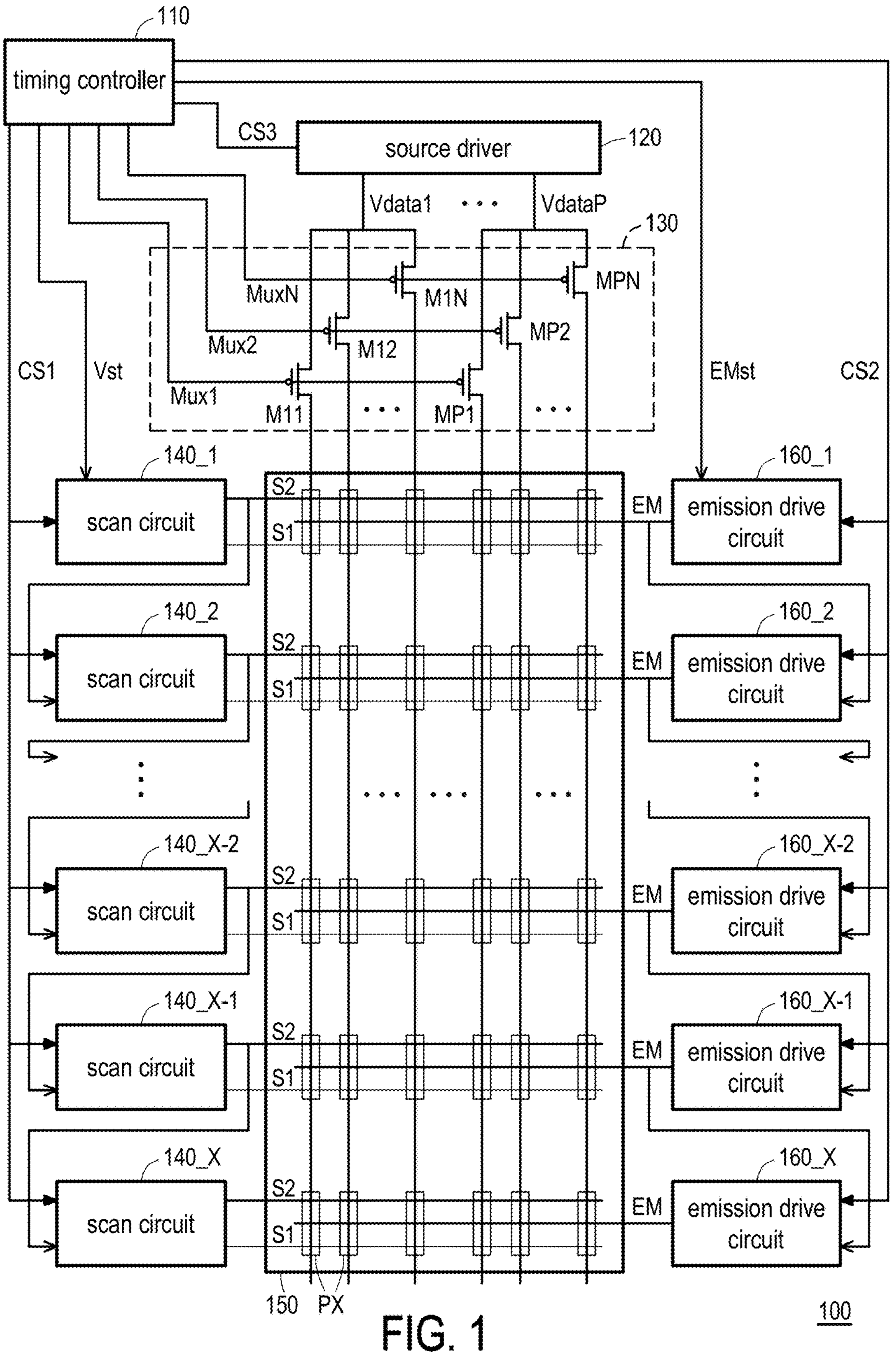
FIG. 1 is a system diagram of a display device according to an implementation of the disclosure.

FIG. 1 is a system diagram of a display device according to an implementation of the disclosure. Referring to FIG. 1, in the present implementation, the display device 100 includes a timing controller 110, a source driver 120, a multiplex circuit 130, a plurality of scan circuits 140_1-140_X, a pixel array 150, and a plurality of emission drive circuits 160_1-160_X, wherein the pixel array 150 has a plurality of self-luminous pixel circuits PX arranged in an array, and X is a positive integer.

The pixel array 150 is coupled between the multiplex circuit 130, the plurality of scan circuits 140_1-140_X, and the plurality of emission drive circuits 160_1-160_X, to receive scan signals S1 and S2 from the scan circuits 140_1-140_X, receive data voltages Vdata1-VdataP from the multiplex circuit 130, and receive emission signals EM from the plurality of emission drive circuits 160_1-160_X, wherein P is a positive integer.

The timing controller 110 is coupled to the source driver 120, the multiplex circuit 130, the scan circuits 140_1-140_X, and the plurality of emission drive circuits 160_1-160_X, to provide control signal CS3 to the source driver 120, provide control signal CS1 and start signal Vst to the scan circuits 140_1-140_X, and provide control signal CS2 and start signal EMst to the emission drive circuits 160_1-160_X. Moreover, the source driver 120 is coupled to the multiplex circuit 130, to provide the data voltages Vdata1-VdataP to the multiplex circuit 130.

The multiplex circuit 130 receives the data voltages Vdata1-VdataP from the source driver 120 and multiplexing control signals Mux1-MuxN from the timing controller 110, and based on the multiplexing control signals Mux1-MuxN, provides the data voltages Vdata1-VdataP to the self-luminous pixel circuits PX, wherein N is a positive integer. Moreover, the emission drive circuits 160_1-160_X receive the control signal CS2 and the start signal EMst from the timing controller 110, to provide the plurality of emission signals EM to the self-luminous pixel circuits PX.

During a horizontal scan period, the multiplexing control signals Mux1-MuxN simultaneously form a precharge pulse and sequentially form a plurality of multiplex pulses which are not overlapped to each other in time (as shown in FIG. 2A to FIG. 6), wherein the precharge pulse and the multiplex pulses have a first multiplexing edge in front and a second multiplexing edge in back. A corresponding one of the emission signals EM forms an emission pulse having a first edge and a second edge, wherein the first edge and the second edge are at least one charge discharge time away from the second multiplexing edges of the precharge pulse and the multiplex pulses.

Furthermore, the second multiplexing edge of the multiplexing control signals Mux1-MuxN stops the transmission of the data voltages Vdata1-VdataP. If the first edge and the second edge of the emission pulse of the corresponding emission signal EM are too close to the second multiplexing edges of the multiplexing control signals Mux1-MuxN (i.e., the distance between there is less than the charge discharge time), the coupled charge may be unable to release, affecting the data voltages Vdata1-VdataP transmitted by the multiplex circuit 130. Therefore, when the first edge and the second edge of the emission pulse of the corresponding emission signal EM are away from the second multiplexing edge of the multiplexing control signals Mux1-MuxN by the charge discharge time, the coupled charge allows to completely released, reducing the impact of the first edge and the second edge of the emission pulse of the corresponding emission signal EM on the data voltages Vdata1-VdataP.

In the present implementation, the start signal Vst is used to initiate the scan circuits 140_1-140_X, and the start signal EMst is used to initiate the emission drive circuits 160_1-160_X.

In the present implementation, the multiplex circuit 130 includes a plurality of transistors M11-MPN, which are controlled by the multiplexing control signals Mux1-MuxN to transmit the data voltages Vdata1-VdataP to the corresponding rows of self-luminous pixel circuits PX, wherein the transistors M11-MPN are exemplified as P-type transistors in here, but the implementations of the disclosure is not limited thereto.

In the present implementation, the charge discharge time may be, for example, the time constant 5RC.

Figure 2A:
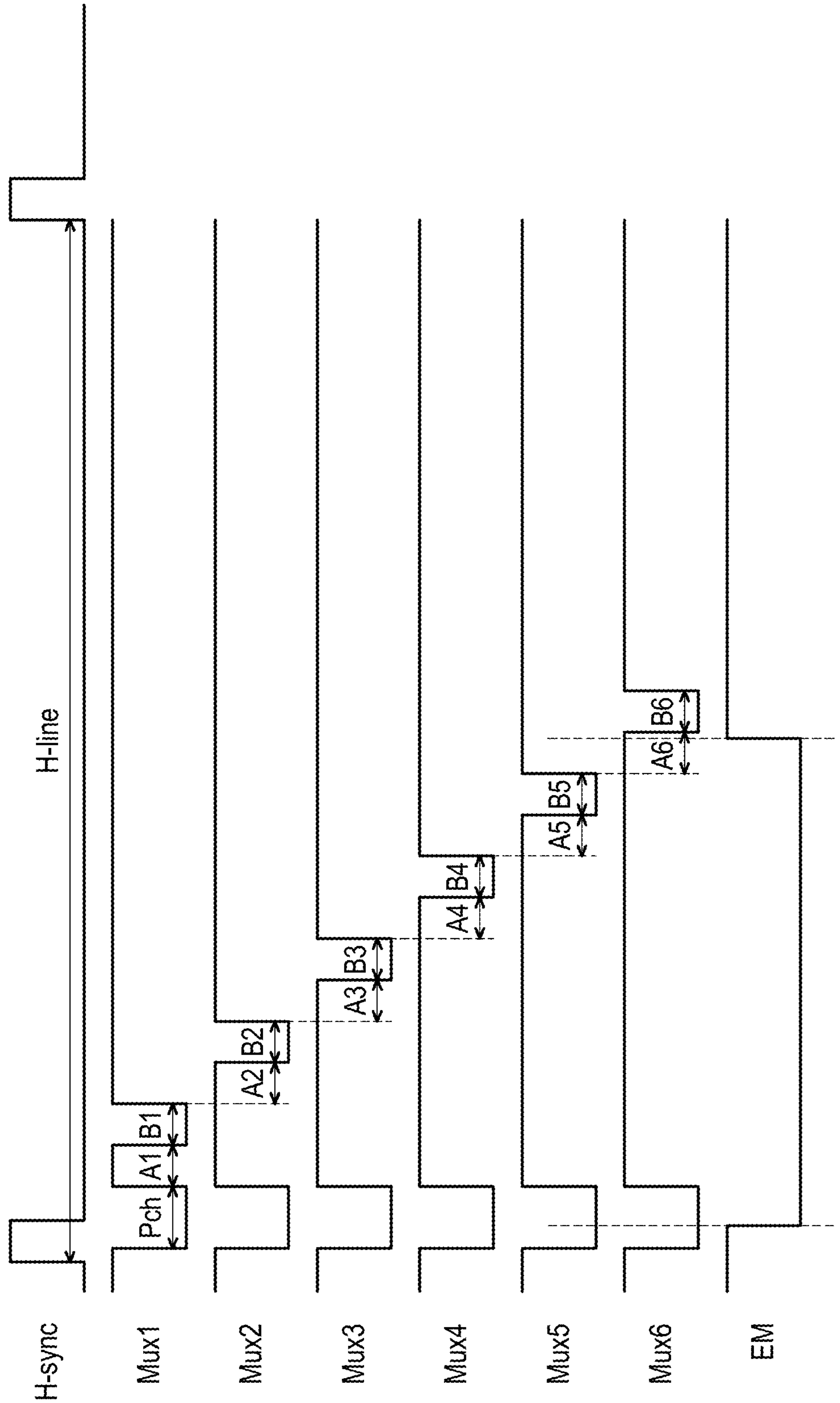
FIG. 2A is a timing diagram of the multiplexing control signals and the emission signals according to a first implementation of the disclosure.
Figure 2B:
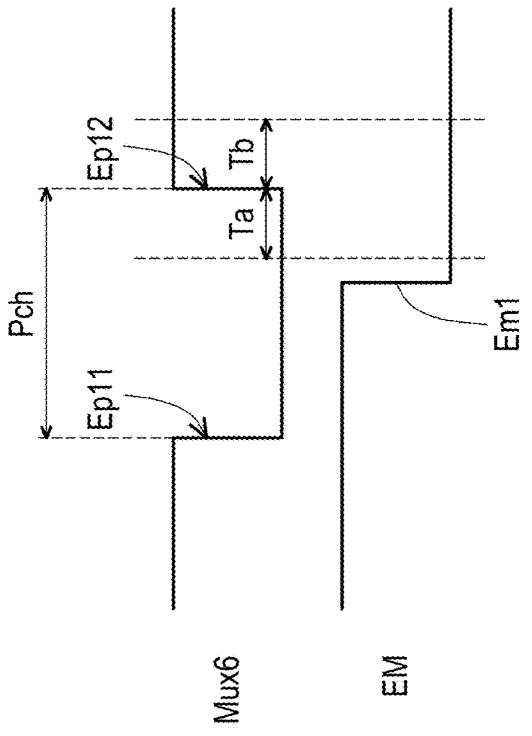
FIG. 2B and FIG. 2C are enlarged timing diagrams of partial timing of the multiplexing control signals and the emission signals of FIG. 2A.
Figure 2C:
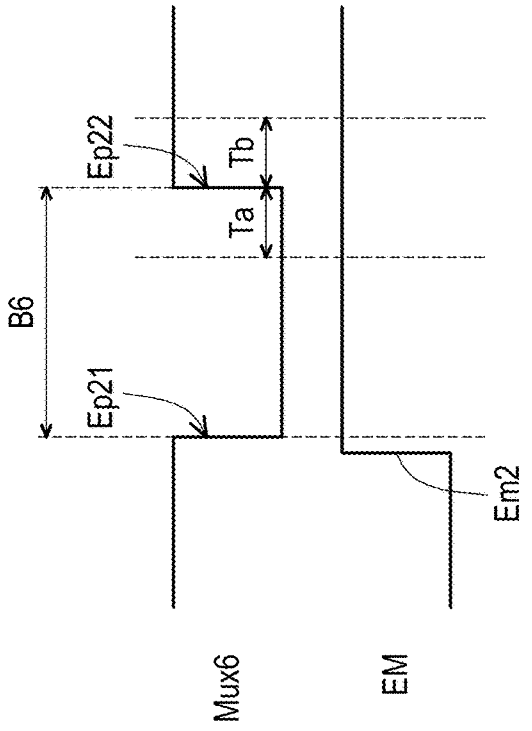

FIG. 2A is a timing diagram of the multiplexing control signals and the emission signals according to a first implementation of the disclosure. FIG. 2B and FIG. 2C are enlarged timing diagrams of partial timing of the multiplexing control signals and the emission signals of FIG. 2A. Referring to FIG. 1 and FIG. 2A to FIG. 2C, in the present implementation, six multiplexing control signals Mux1-Mux6 are used as an example, but the implementations of the disclosure is not limited thereto. In the horizontal scan period H-line defined between two pulses of the horizontal synchronization signal H-sync, the multiplexing control signals Mux1-Mux6 first simultaneously form precharge pulses Pch to release the charge on the line. Then, the multiplexing control signals Mux1-Mux6 sequentially form a plurality of multiplex pulses B1-B6 which are not overlapped to each other in time, where time intervals A1-A6 between the multiplex pulses B1-B6 and the precharge pulses Pch may be the same as each other, and the pulse widths of the multiplex pulses B1-B6 are also the same as each other. The horizontal synchronization signal H-sync may be one of the control signals CS3 provided to the source driver 120, but the implementations of the disclosure is not limited thereto.

In the present implementation, the precharge pulses Pch and multiplex pulses B1-B6 have a first multiplexing edge at the front (as shown as the falling edges Ep11, Ep21, but the implementations of the disclosure is not limited thereto) and a second multiplexing edge at the back (as shown as the rising edges Ep12, Ep22, but the implementations of the disclosure is not limited thereto). Moreover, an emission pulse with a first edge Em1 (exemplified as a falling edge here, but the implementations of the disclosure is not limited thereto) and a second edge Em2 (exemplified as a rising edge here, but the implementations of the disclosure is not limited thereto) will be formed on the emission signal EM. In the horizontal scan period H-line, the first edge Em1 of the emission pulse may be located within the precharge pulses Pch, and far away from the second multiplexing edge Ep12 of the precharge pulses Pch by a range of charge discharge times Ta and Tb. Additionally, the second edge Em2 of the emission pulse may be located between the two later multiplex pulses B5-B6 among the multiplex pulses B1-B6, i.e. far away from the second multiplexing edge (such as Ep22) of the multiplex pulses B5-B6 by a range of charge discharge times Ta and Tb.

In the implementations of the disclosure, the charge discharge time Ta is related to the time constant of the data voltage (such as Vdata1-VdataP) (i.e., related to the time constant of the data line), and the charge discharge time Tb is related to the time constant of the lines within circuits of the multiplexer circuit 130, which is determined based on the circuit design requirements, but the implementations of the disclosure is not limited thereto.

Figure 3:
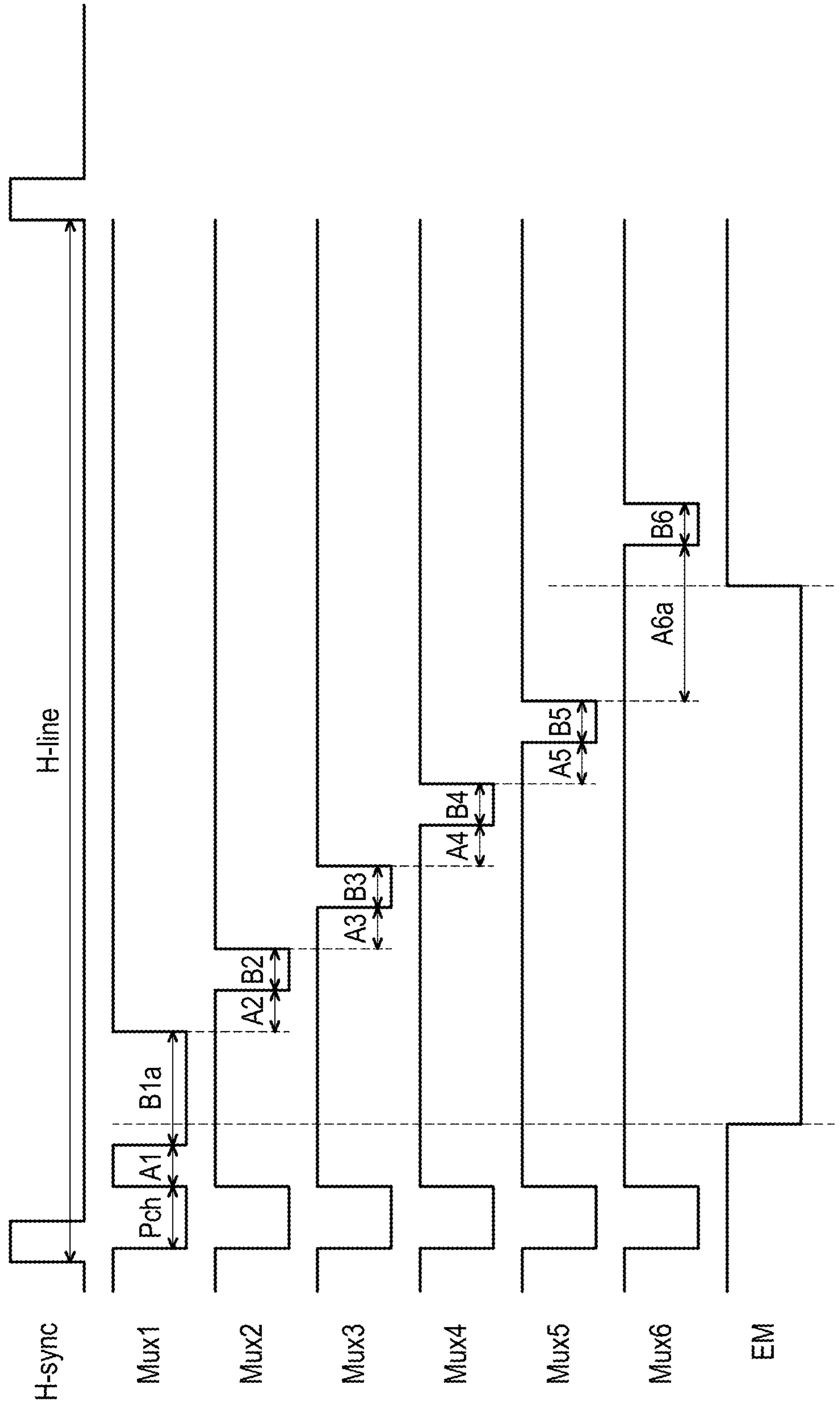
FIG. 3 is a timing diagram of the multiplexing control signals and the emission signals according to a second implementation of the disclosure.

FIG. 3 is a timing diagram of the multiplexing control signals and the emission signals according to a second implementation of the disclosure. Please refer to FIG. 1, FIG. 2A to FIG. 2C and FIG. 3, where the same or similar components use the same or similar reference numerals. In the present implementation, during the horizontal scan period H-line, the first edge Em1 of the emission pulse is located within the first multiplex pulse B1*a*, and the second edge Em2 of the emission pulse is located between the two later multiplex pulses B5-B6 among the multiplex pulses B1-B6.

In the present implementation, the pulse width of the first multiplex pulse B1*a* is greater than the pulse widths of the remaining multiplex pulses B5-B6, i.e. the pulse width of the first multiplex pulse B1*a* is widened. Moreover, the time interval A6*a* between the two later multiplex pulses B5-B6 among the multiplex pulses B1-B6 is greater than the plurality of time intervals A1-A5 between the remaining multiplex pulses B1-B6 among the multiplex pulses B1-B6, i.e. the time interval A6*a* is enlarged.

Figure 4:
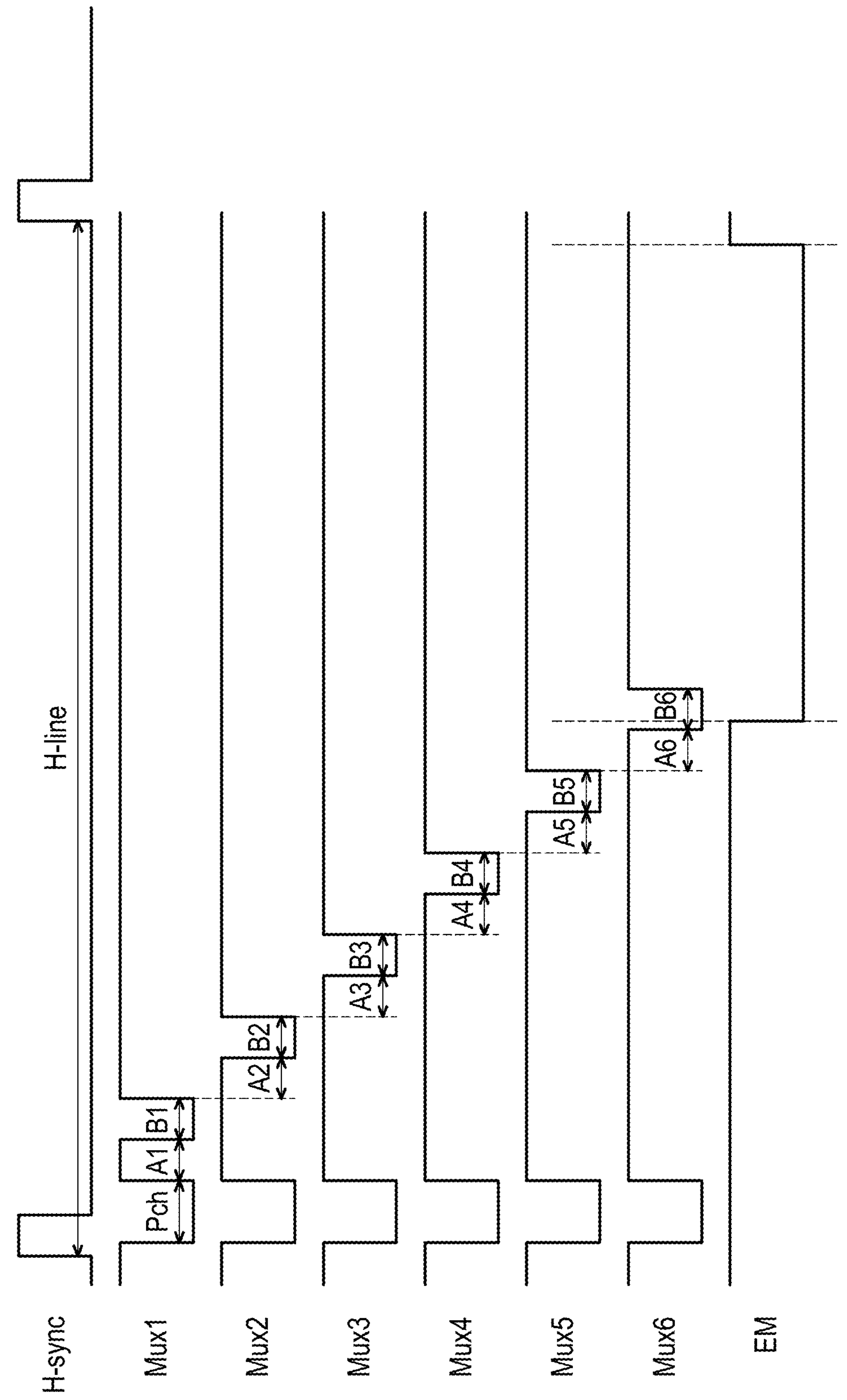
FIG. 4 is a timing diagram of the multiplexing control signals and the emission signals according to a third implementation of the disclosure.

FIG. 4 is a timing diagram of the multiplexing control signals and the emission signals according to a third implementation of the disclosure. Please refer to FIG. 1, FIG. 2A to FIG. 2C and FIG. 4, where the same or similar components use the same or similar reference numerals. In the present implementation, during the horizontal scan period H-line, the first edge Em1 of the emission pulse is located within the last multiplex pulse B6 among the multiplex pulses B1-B6, and the second edge Em2 of the emission pulse is located after the last multiplex pulse B6 and close to the end of the horizontal scan period H-line.

Figure 5:
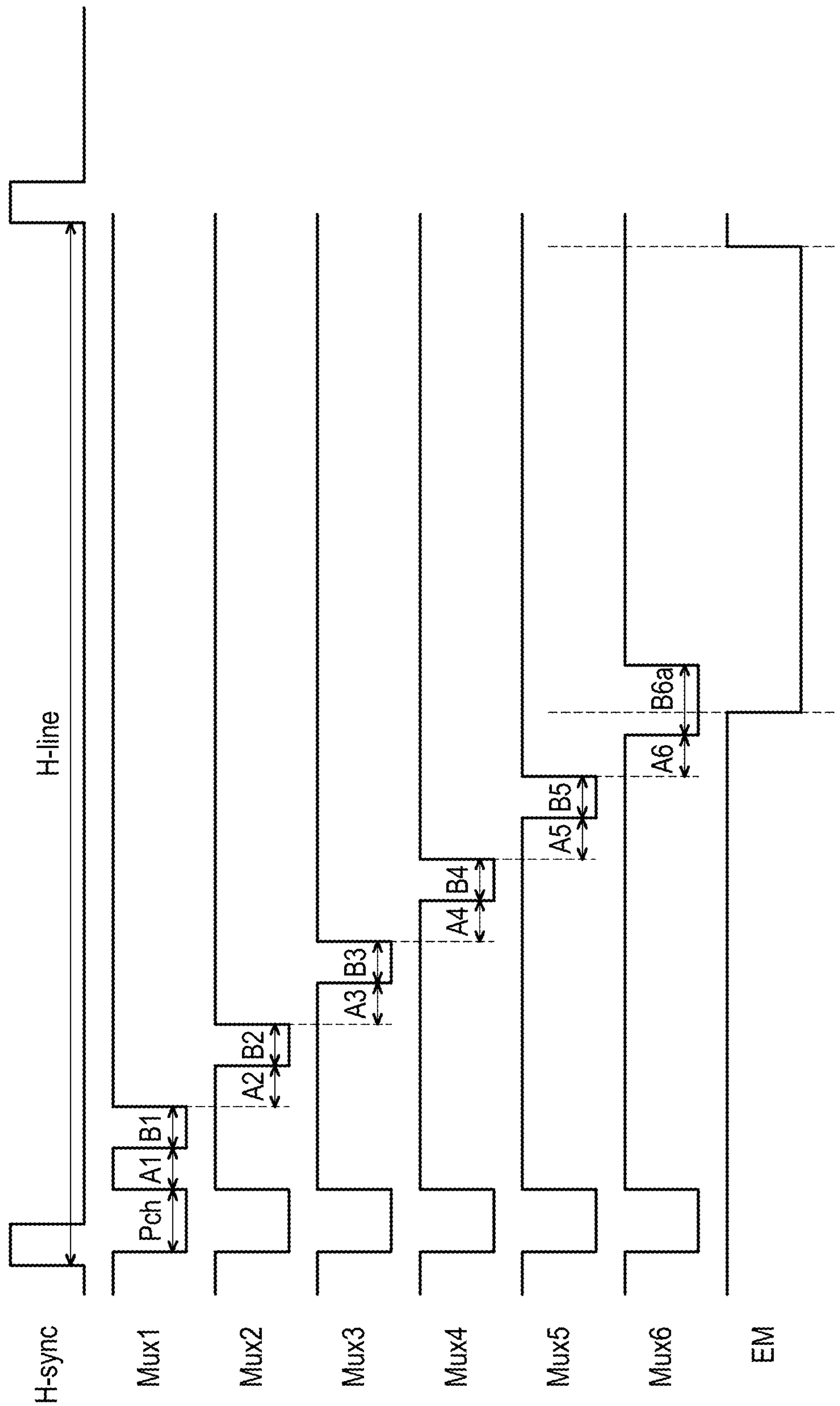
FIG. 5 is a timing diagram of the multiplexing control signals and the emission signals according to a fourth implementation of the disclosure.

FIG. 5 is a timing diagram of the multiplexing control signals and the emission signals according to a fourth implementation of the disclosure. Please refer to FIG. 1, FIG. 2A to FIG. 2C and FIG. 5, where the same or similar components use the same or similar reference numerals. In the present implementation, during the horizontal scan period H-line, the first edge Em1 of the emission pulse is located within the last multiplex pulse B6*a* among the multiplex pulses B1-B6, and the second edge Em2 of the emission pulse is located after the last multiplex pulse B6*a* and close to the end of the horizontal scan period H-line, where the pulse width of the last multiplex pulse Boa is greater than the plurality of pulse widths of the remaining multiplex pulses B1-B5, i.e. the pulse width of the last multiplex pulse B6*a* is widened.

Figure 6:
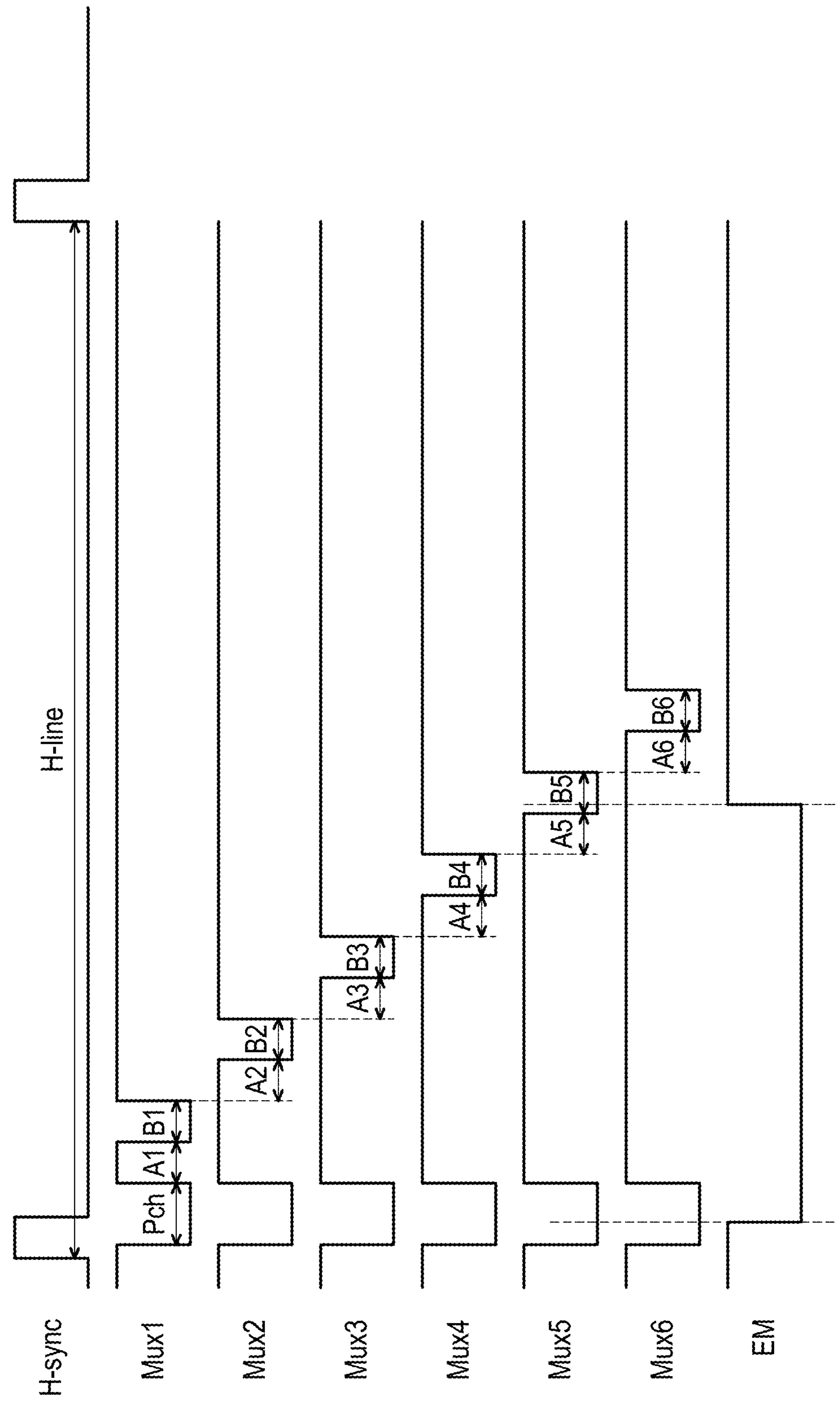
FIG. 6 is a timing diagram of the multiplexing control signals and the emission signals according to a fifth implementation of the disclosure.

FIG. 6 is a timing diagram of the multiplexing control signals and the emission signals according to a fifth implementation of the disclosure. Please refer to FIG. 1, FIG. 2A to FIG. 2C and FIG. 6, where the same or similar components use the same or similar reference numerals. In the present implementation, during the horizontal scan period H-line, the first edge Em1 of the emission pulse is located within the precharge pulses Pch, and the second edge Em2 of the emission pulse is located between the second to last multiplex pulse B5 among the multiplex pulses B1-B6.

Synthesizing the above implementations, the first edge Em1 and the second edge Em2 of the emission signal EM are at least one charge discharge time (such as Ta, Tb) away from the second multiplexing edges Ep12 of the precharge pulses Pch and the multiplex pulses B1-B6, to reduce the influence of the first edge and the second edge of the emission pulse of the emission signal EM on the data voltages Vdata1-VdataP. Moreover, according to the brightness requirement for illumination, the first edge Em1 of the emission signal EM may be located in any one of the precharge pulses Pch and the multiplex pulses B1-B6 or in any one of the time intervals A1-A6 between the multiplex pulses B1-B6 and the precharge pulses Pch, and the precharge pulses Pch, multiplex pulses B1-B6 and time intervals A1-A6 may be widened according to the driving requirements. Correspondingly, the second edge Em2 of the emission signal EM may be located in any one of the multiplex pulses B1-B6 or in any one of the time intervals A1-A6 between the multiplex pulses B1-B6 and the precharge pulses Pch, and the multiplex pulses B1-B6 and time intervals A1-A6 may be widened according to the driving requirements. The aforementioned driving method may be determined based on circuit design requirements or environmental changes, and the implementations of the disclosure is not limited thereto.

In summary, in the display device of the implementations of the disclosure, during the horizontal scan period, the first edge and the second edge of the corresponding one of the emission signals are at least one charge discharge time away from the precharge pulse and the second multiplexing edges of the multiplex pulses, to reduce the influence of the first edge and the second edge of the emission pulse of the emission signal on the data voltages.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:

a pixel array, having a plurality of self-luminous pixel circuits arranged in an array;

a multiplexer circuit, coupled to the pixel array, and receiving a plurality of data voltages and a plurality of multiplexing control signals, to provide the data voltages to the self-luminous pixel circuits based on the multiplexing control signals;

a plurality of emission driving circuits, coupled to the pixel array, to provide a plurality of emission signals to the self-luminous pixel circuits, wherein during a horizontal scanning period, the multiplexing control signals simultaneously form precharge pulses and sequentially form a plurality of multiplexer pulses which are not overlapped to each other in time, wherein the precharge pulses and the multiplexer pulses each have a first multiplexing edge in front and a second multiplexing edge in back, and an emission pulse having a first edge and a second edge is formed on a corresponding one of the emission signals, wherein the first edge and the second edge are at least one charge discharge time away from the second multiplexing edges of the precharge pulses and the multiplexer pulses, wherein the first edge is located between the first multiplexing edges of the precharge pulses and the second multiplexing edge of last multiplexer pulse among the multiplexer pulses, wherein the charge discharge time before one of the second multiplexing edges is determined by a time constant of the data lines, and the charge discharge time after one of the second multiplexing edges is determined by a time constant of the multiplexer circuit; and wherein during the horizontal scanning period, the first edge of the emission pulse is located within a first multiplexer pulse among the multiplexer pulses, and the second edge of the emission pulse is located between two later multiplexer pulses among the multiplexer pulses.

2. The display device of claim 1, wherein a pulse width of the first multiplexer pulse is greater than pulse widths of remaining multiplexer pulses among the multiplexer pulses.

3. The display device of claim 1, wherein a time interval between the two later multiplexer pulses among the multiplexer pulses is greater than time intervals between remaining multiplexer pulses among the multiplexer pulses.

4. A display device, comprising:

a pixel array, having a plurality of self-luminous pixel circuits arranged in an array;

a multiplexer circuit, coupled to the pixel array, and receiving a plurality of data voltages and a plurality of multiplexing control signals, to provide the data voltages to the self-luminous pixel circuits based on the multiplexing control signals;

a plurality of emission driving circuits, coupled to the pixel array, to provide a plurality of emission signals to the self-luminous pixel circuits, wherein during a horizontal scanning period, the multiplexing control signals simultaneously form precharge pulses and sequentially form a plurality of multiplexer pulses which are not overlapped to each other in time, wherein the precharge pulses and the multiplexer pulses each have a first multiplexing edge in front and a second multiplexing edge in back, and an emission pulse having a first edge and a second edge is formed on a corresponding one of the emission signals, wherein the first edge and the second edge are at least one charge discharge time away from the second multiplexing edges of the precharge pulses and the multiplexer pulses, wherein the first edge is located between the first multiplexing edges of the precharge pulses and the second multiplexing edge of last multiplexer pulse among the multiplexer pulses, wherein the charge discharge time before one of the second multiplexing edges is determined by a time constant of the data lines, and the charge discharge time after one of the second multiplexing edges is determined by a time constant of the multiplexer circuit; and wherein during the horizontal scanning period, the first edge of the emission pulse is located within a last multiplexer pulse among the multiplexer pulses, and the second edge of the emission pulse is located after the last multiplexer pulse.

5. The display device of claim 4, wherein a pulse width of the last multiplexer pulse is greater than pulse widths of remaining multiplexer pulses among the multiplexer pulses.

6. A display device, comprising:

a pixel array, having a plurality of self-luminous pixel circuits arranged in an array;

a multiplexer circuit, coupled to the pixel array, and receiving a plurality of data voltages and a plurality of multiplexing control signals, to provide the data voltages to the self-luminous pixel circuits based on the multiplexing control signals;

a plurality of emission driving circuits, coupled to the pixel array, to provide a plurality of emission signals to the self-luminous pixel circuits, wherein during a horizontal scanning period, the multiplexing control signals simultaneously form precharge pulses and sequentially form a plurality of multiplexer pulses which are not overlapped to each other in time, wherein the precharge pulses and the multiplexer pulses each have a first multiplexing edge in front and a second multiplexing edge in back, and an emission pulse having a first edge and a second edge is formed on a corresponding one of the emission signals, wherein the first edge and the second edge are at least one charge discharge time away from the second multiplexing edges of the precharge pulses and the multiplexer pulses, wherein the first edge is located between the first multiplexing edges of the precharge pulses and the second multiplexing edge of last multiplexer pulse among the multiplexer pulses, wherein the charge discharge time before one of the second multiplexing edges is determined by a time constant of the data lines, and the charge discharge time after one of the second multiplexing edges is determined by a time constant of the multiplexer circuit; and wherein during the horizontal scanning period, the first edge of the emission pulse is located within the precharge pulses, and the second edge of the emission pulse is located within a penultimate multiplexer pulse among the multiplexer pulses.

* * * * *